Patented Apr. 15, 1947

2,418,832

UNITED STATES PATENT OFFICE 2,418,832

CHEMICAL PROCESS AND COMPOUND THEREFROM

William E. Hanford and Jesse Harmon, Wilmington, Del., assignors to E. I. du Pont de Nemours & Company, Wilmington, Del., a corporation of Delaware No Drawing. Application June 17, 1942, Serial No. 447,429

8 Claims. (Cl. 260—663)

This invention relates to a telomerization reaction. More specifically, it relates to a telomerization reaction which results in the production of new compounds from hydrogen chloride and ethylene.

In copending application Serial No. 438,466, filed April 10, 1942, a novel chemical reaction has been disclosed. The reaction has been called "telomerization" (from Greek telos, meaning "end" plus Greek mer meaning "part"). "Telomerization" is defined as the process of reacting, under polymerization conditions, a molecule YZ which is called a "telogen" with more than one unit of a polymerizable compound having ethylenic unsaturation called a "taxogen" to form products called "telomers" having the formula $Y(A)_nZ$ wherein $(A)_n$ is a divalent radical formed by condensation of the taxogen, the unit A being called a "taxomon," $n$ being any integer greater than one, and Y and Z being fragments of the telogen attached to the terminal taxomons. The term "condensation," as used in defining A, is employed in its broad sense to describe a chemical union with the formation of new carbon bonds and not in the sense of a reaction involving the removal of an element or simple molecule.

Certain of the straight-chain primary alkyl chlorides may be prepared by known reactions from the corresponding alcohols; only a limited number of these are of low cost, and most of the higher members are not available at all. Other reactions for the preparation of alkyl halides, such as the hydrochlorination of olefins or the chlorination of paraffins, give rise to secondary alkyl chlorides or complex mixtures of primary and secondary chlorides. All of these methods suffer the common disadvantage that the alkyl chlorides obtainable are limited to those having the same chain length as the available starting materials. The Friedel-Crafts reaction of olefins with hydrogen chloride in the presence of aluminum chloride is known to be complicated by side reactions which give rise to higher alkyl chlorides. However, these mixtures are likely to contain a wide variety of isomers formed by the reactions of polymerization, isomerization, disproportionation, and condensation, all of which may be induced by aluminum chloride. Under the present invention, it is possible to produce mixtures of straight-chain primary alkyl chlorides from the inexpensive starting material, ethylene. The average molecular weight of the products can be varied as desired by adjusting the reaction conditions. The mixtures can be used as such, or, if desired, they can be distilled for use as boiling ranges or pure compounds.

The reaction of olefinic compounds with hydrogen chloride to give simple addition products is well known in the art. It is, furthermore, well known that vinyl compounds can be polymerized by the action of certain catalysts such as peroxides, persulfates, metal alkyls, etc., at elevated temperatures. It is known that the molecular weight of the polymers may be lowered to a certain extent by carrying out the polymerization at elevated temperatures or in the presence of certain foreign substances, such as organic solvents, aldehydes, organic or mineral acids, or large excesses of catalyst. However, it has previously not been known that olefinic compounds could be reacted with hydrogen chloride to produce terminal substituted chlorides containing more than one unit of the olefinic compound.

It is an object of this invention to produce new chemical compounds. Another object is to provide a process for reacting hydrogen chloride with more than one unit of ethylene to produce telomers. A further object is to discover suitable conditions for this reaction. Other objects will appear hereinafter.

The objects have been accomplished by the discovery that hydrogen chloride will react with more than one unit of ethylene at elevated pressures, when subjected to the action of a telomerization catalyst, to produce telomers. The reaction can be expressed by the following equation: $n(CH_2=CH_2) + HCl \rightarrow H—(CH_2CH_2)_n—Cl$ wherein $n$ is an integer greater than one.

This reaction results in telomers having fragments of the hydrogen chloride; i. e., H— and —Cl, as the terminal atoms and having several taxomon units resulting from the condensation of the taxogen; i. e., ethylene, between said terminal atoms. A given reaction results in a mixture of products which have different molecular weights and which differ in the number of taxomon units in the molecule. In other words, the products differ in the numerical value of $n$. By suitable control of the reaction conditions, the average value of $n$ can be controlled. In this way, products of very short chain length, moderate chain length, or long chain length can be obtained.

The catalyst, which has been termed a telomerization catalyst, is any agent which is effective as a catalyst for the polymerization of vinyl compounds, but which is ineffective as a catalyst for the Friedel-Crafts reaction; e. g. peroxygen compounds, molecular oxygen, metal alkyls, etc.

The reaction is carried out in a pressure vessel so designed that the contents may be heated and agitated. Since it is generally preferable to employ water as a liquid medium for the reaction, it is desirable that the vessel be lined with a material that is resistant to the action of hydrochloric acid. A suitable apparatus is a steel tube, lined with a nickel-molybdenum alloy, closed at the ends with caps of the same resistant material, and fitted with a thermocouple well for measuring the inside temperature and an inlet line for admitting the gaseous reagents during the reaction. The gas inlet system includes a pressure gauge and a safety rupture disc connected to a vent.

In carrying out the telomerization, the reactor is charged with the catalyst and a reaction medium before closing. The preferred medium is water, and this may also contain the hydrogen chloride, so that the latter need not necessarily be added as a gas during the subsequent operation. A diacyl peroxide, such as benzoyl peroxide, is suitable as a catalyst, and approximately 0.005 mol per mol of hydrogen chloride is sufficient. After the reactor is closed, hydrogen chloride may be added as a gas, if desired. Ethylene is then admitted in quantity sufficient to produce the desired pressure when the reaction temperature is reached. The relative quantities of hydrochloric acid, water, and ethylene, as well as the temperature chosen for carrying out the reaction, determine the molecular weight distribution in the product obtained. The ethylene concentration is conveniently measured in terms of the pressure and this depends upon the kind and quantity of liquid reaction medium used. Preferred ranges are 200–1000 atmospheres pressure at reaction temperatures of 50° C. to 150° C. for a reactor approximately one-fourth filled with aqueous hydrochloric acid of 5 to 50 per cent concentration using a benzoyl peroxide catalyst. Use of the higher limit of pressure in conjunction with the lower limit of hydrochloric acid concentration gives a product which consists principally of wax-like higher alkyl halides having chain lengths of several hundred carbon atoms. Reducing the ethylene pressure or increasing the hydrochloric acid concentration results in a lowering of the average chain length, and it is, thus, possible to obtain mixtures of lower alkyl halides, all of which are distillable, as well as compositions of any desired intermediate chain length. Other things being equal, increasing the temperature of reaction results in a lowering of the average molecular weight. Since the weight of ethylene in the reactor at a given pressure depends upon the temperature, a given product may be prepared at a lower pressure if the reaction temperature is decreased.

The reaction usually begins during the time in which the mixture is being brought to the desired reaction temperature; the absorption of ethylene is indicated by a drop in pressure and, in many cases, a considerable rise in temperature. Ethylene may be added from a high pressure storage vessel as needed to keep the pressure within a predetermined range. Since the hydrochloric acid is usually used in excess, replacing the ethylene has the effect of keeping the concentration of reactants more nearly constant.

The course of the reaction is conveniently followed by observation of the drop in pressure, and cessation of the reaction due to exhaustion of the catalyst or reactants is indicated when there is no further drop in pressure. Any excess gas remaining in the reactor is then bled off, and the product is discharged. It may vary in consistency from a mobile liquid, through greasy or wax-like products, to a solid. It is separated from the aqueous layer and washed free of any excess hydrochloric acid. Liquid products are readily separated into their components by fractional distillation, since the constituent alkyl halides differ in chain lengths by whole ethylene units. Pure normal butyl, hexyl, octyl, decyl, dodecyl, tetradecyl, hexadecyl, octadecyl, and eicosyl chlorides can be obtained in this way. However, since the components are members of an homologous series, they react similarly, and the mixtures can advantageously be used in certain reactions as if they were pure compounds. The liquid products can conveniently be separated from the greasy and wax-like higher products by steam distillation or distillation in vacuum, and the remaining higher telomers can then be further separated, if desired, by selective solvent extraction or precipitation from solution by the addition of a non-solvent. For example, a grease-like product ranging in composition from $C_{20}H_{41}Cl$ to about $C_{40}H_{81}Cl$ can be obtained from a whole reaction mixture by distilling off the lower halides, extracting the residue with ether, and evaporating the ether solution. The products of still higher molecular weight can be dissolved in a solvent; e. g., toluene, and partially precipitated by the addition of a non-solvent; e. g., methanol.

The hydrochloric acid and the ethylene used can be of any good commercial grade. Certain substances are known to inhibit the polymerization of ethylene, and, since these same substances may, under some circumstances, inhibit the telomerization reaction, it is best to use fairly pure materials. Small quantities of oxygen, nitrogen, and foreign hydrocarbons are permissible as impurities in the ethylene.

The following examples illustrate the principles involved in the invention. All parts are by weight.

*Example I*

In a pressure reactor lined with an acid-resistant alloy of nickel, molybdenum, and iron is placed 50 parts of water, 50 parts of concentrated hydrochloric acid (sp. gr. 1.188; about 37 per cent), and 0.5 part of benzoyl peroxide, the liquid charge occupying approximately one-fourth of the total internal volume of the reactor. The reactor is closed and placed in a reciprocating agitator, and ethylene is admitted to a pressure of 200 atmospheres. The temperature is then raised to 100° C. and additional ethylene is introduced to bring the pressure to 500 atmospheres; as the pressure falls due to the reaction, ethylene is intermittently added from a storage vessel to maintain a range of 400 to 500 atmospheres. The sum of the individual pressure drops occurring between additions of ethylene during 4.5 hours is 385 atmospheres. In an additional 2 hours, the fall in pressure is only 5 atmospheres, and the pressure then remains constant, indicating that the reaction is complete. The reactor is cooled and the ethylene is bled off before discharging the product. The product, an oily white liquid, is taken up in ether, separated from the aqueous phase, and washed with 5 per cent sodium bicarbonate solution and water. The ether solution is filtered to remove the insoluble part of the product, dried, and stripped of ether by distillation through a column. The 40 parts of higher boiling material which remains is distilled through an efficient fractionating column, first at atmospheric pressure, and then in vacuum. The mixture is thereby sharply separated into its pure components, as follows:

| | Per cent |
|---|---|
| n-Butyl chloride | 5 |
| n-Hexyl chloride | 5 |
| n-Octyl chloride | 8 |
| n-Decyl chloride | 9 |
| n-Dodecyl chloride | 7 |
| n-Tetradecyl chloride | 5 |
| n-Hexadecyl chloride | 4 |
| n-Octadecyl chloride | 6 |
| n-Eicosyl chloride | 5 |
| Higher alkyl chlorides (residue) | 40 |
| Total | 94 |

The alkyl chlorides are characterized by their boiling points and their identity is confirmed by determination of the refractive index and chlorine content. The residue of higher alkyl chlorides is a soft grease which is found to contain 7.0 per cent chlorine. From this, the average composition is calculated to be $C_{33}H_{67}Cl$.

The ether-insoluble portion (6 parts) of the product which is filtered off before the distillation is a soft white wax. It contains 6.11 per cent chlorine which corresponds to an average composition of $C_{33}H_{77}Cl$.

*Example II*

The ethylene concentration may be increased by operating at a higher pressure, and the average molecular weight of the product is thereby increased.

The reactor is charged as in Example I except that the initial ethylene pressure is 400 atmospheres. As the temperature is being raised, a rapid reaction sets in at about 90° C. as evidenced by a marked rise in temperature and fall of pressure. Ethylene is added intermittently to maintain the pressure as nearly as possible within a range of 850 to 950 atmospheres, and, during the next 45 minutes, the sum of the observed pressure drops between additions of ethylene is 840 atmospheres. During the ensuing 6.75 hours, the pressure drop is 230 atmospheres. At the end of this time, the reaction is no longer proceeding with measurable velocity.

As in Example I, a preliminary separation is made by suspending the product in about 5 volumes of ether and filtering off the insoluble part. In this case, only 19 parts of the mixture of ether-soluble alkyl chlorides is produced, and, at the same time, there is formed 22 parts of ether-insoluble wax-like product. This mixture of higher alkyl chlorides contains 4.77 per cent chlorine, from which it may be calculated that the average molecular weight is 744, corresponding to an average composition of $C_{51}H_{103}Cl$.

*Example III*

Oxygen in low concentrations acts as a catalyst for the reaction, but the preferred operating temperature is higher than that for benzoyl peroxide.

One hundred (100) parts of 18.5 per cent aqueous hydrochloric acid is placed in a reactor lined with an acid-resistant alloy of nickel, molybdenum, and iron. The charge occupies approximately one-fourth of the total internal volume of the reactor, and, since the remainder of the space is filled with air at the time of the closing, the charge includes approximately 0.0086 part of oxygen. Ethylene is then admitted to a pressure of 200 atmospheres, and the mixture is heated to a temperature of 200° C. Additional ethylene is then admitted to raise the pressure to 930 atmospheres and at intervals thereafter to maintain a pressure in the neighborhood of 900 atmospheres. At the end of 3 hours, a total drop in pressure of 125 atmospheres has been noted. The reactor is allowed to cool, and the product is discharged. It is a mobile liquid (8 parts) consisting of a mixture of straight-chain primary alkyl chlorides having an even number of carbon atoms, the major part of which are volatile with steam.

*Example IV*

The reaction is also promoted by the alkyl and aryl derivatives of the heavy metals.

A reactor is charged with 100 parts of 9.25 per cent aqueous hydrochloric acid and 1 part of lead tetraphenyl. It is closed and evacuated, and ethylene is then admitted to a pressure of 200 atmospheres. The reaction is then carried out at a temperature of 200° C. and ethylene pressures in the neighborhood of 900 atmospheres. After 2 hours, the reactor is allowed to cool and the product is discharged. It is a soft grease (4 parts) consisting of a mixture of alkyl chlorides, about two-thirds of which is soluble in ether and one-third of which is wax-like and insoluble in ether.

*Example V*

Decreasing the concentration of hydrochloric acid increases the average molecular weight of the product, and a low concentration of hydrochloric acid in conjunction with a high pressure of ethylene results in a product of very high molecular weight which is contaminated with unmodified polyethylene.

A Hastelloy-lined pressure reactor is charged with 120 parts of water containing 2.2 parts of hydrogen chloride and 0.5 part of benzoyl peroxide. It is then closed and further charged with ethylene to a pressure of 500 atmospheres. Reaction begins while the mixture is being heated to a temperature of 100° C., and the pressure in the vessel actually falls while the temperature is being increased. Ethylene is added intermittently to maintain a pressure range of 800 to 990 atmospheres, and during 3.5 hours a total drop in pressure of 775 atmospheres is noted. At this time, the reaction is completed as shown by the absence of any further drop in pressure, so the tube is cooled, the pressure is released, and the contents are discharged. The product is a fluffy, water-repellent, white solid (67 parts). It is thoroughly washed by grinding in the presence of distilled water and drying in vacuum at 60° C. It contains 0.09 per cent chlorine. Calculated on the assumption that every molecule contains an atom of chlorine, the number average molecular weight is 394,000; however, the weight average molecular weight as calculated from a determination of the relative viscosity in xylene is 12,000, showing that only about one molecule in 30 is an alkyl chloride, the remainder being polyethylene. The mixture melts at approximately 120° C. and may be pressed into films similar to those from polyethylene.

A similar run using, however, 4.4 parts of hydrogen chloride gives a product which contains 0.14 per cent chlorine and melts at about 110° C. As the hydrochloric acid concentration is further increased, there is a corresponding increase in chlorine content and decrease in average molecular weight, melting point, and hardness of the product.

Example VI

A silver-lined pressure reactor is charged with 100 parts of iso-octane and 0.6 part of benzoyl peroxide. After closing, the reactor is cooled, evacuated, and further charged with 25 parts of anhydrous hydrogen chloride and sufficient ethylene to raise the pressure to 550 atmospheres. The reactor is then agitated and heated to a temperature of 100° C. and a pressure of 965 atmospheres. During 10 hours, the pressure falls 65 atmospheres. The tube is cooled and the ethyl chloride and excess ethylene are bled off gradually. The iso-octane solution is then removed and washed with water until free of hydrogen chloride (as shown by silver nitrate test). It is found to contain a chlorine compound which, however, distills along with the iso-octane and so cannot be separated from the solvent by distillation.

It is within the scope of this invention to include other taxogens in addition to ethylene, for example, propylene, isobutylene, styrene, vinyl chloride, methyl methacrylate, and diethyl fumarate. It is also possible to use other telogens in addition to hydrogen chloride; e. g., chloroform or carbon tetrachloride, but, in general, this is undesirable because it leads to a mixture of products which do not belong to the same homologous series.

The reaction of the present invention does not occur in the absence of a telomerization catalyst. The catalysts used in the process of this invention are agents which are effective as catalysts for the polymerization of ethylene at elevated temperatures and pressures and which agents are, at the same time, ineffective as catalysts for the Friedel-Crafts reaction. It must be specifically understood that the process of the present invention is not related to the Friedel-Crafts type reactions and that the Friedel-Crafts type catalysts, such as aluminum chloride, boron trifluoride, sulfuric acid, and hydrofluoric acid, are inoperative for the present process. While the agents used in the present reaction are commonly spoken of as catalysts, it is thought that they do not act as an inert catalyzing agent such, for example, as carbon black, but that they take part in the reaction in some way. In fact, it may be that a better term for these agents would be reaction promoters. However, since reaction promoters have been called catalysts so generally in the art, and since the mechanics of the present process are not clearly established, the term "catalyst" has been employed herein.

Both polymerization of ethylene type compounds and Friedel-Crafts reactions with these same type compounds are so well known that any one skilled in the art will be able, without difficulty, to select a catalyst which would be effective to promote polymerization and ineffective to promote Friedel-Crafts reaction. By way of example, however, the following suitable catalysts are mentioned: peroxygen compounds, e. g., diacyl peroxides such as acetyl peroxide, propionyl peroxide, benzoyl peroxide, and lauroyl peroxide; alkali and ammonium persulfates, perborates, and percarbonates; other peroxides such as hydrogen peroxide, ascaridole, tetrahydronaphthalene peroxide, diethyl peroxide, and cyclohexanone peroxide; molecular oxygen; such metal alkyls as tetraethyllead and tetraphenyllead; ultraviolet light, especially in the presence of such photosensitizers as mercury, alkyl iodides, benzoin, and acetone; amine oxides, e. g., trimethylamine oxide, triethylamine oxide, and dimethylaniline oxide; dibenzoyl hydrazine; hydrazine salts such as hydrazine dihydrochloride and hydrazine sebacate; and hexachloroethane. The telomerization catalyst is used in amounts varying from about 0.0001 to 1.0 per cent by weight of the telogen, the preferred range in the case of the peroxygen catalysts being 0.05 to 0.5 per cent.

Of this group of catalysts, it is preferred to use peroxygen compounds, especially the diacyl peroxides. The other member of the preferred group of catalysts is molecular oxygen, which may be considered a special case of this group. It should be emphasized, however, that, to be effective as a catalyst, molecular oxygen must be present in small quantity such as, for example, less than 1000 parts per million. As is generally the case in peroxygen catalyzed vinyl polymerizations, oxygen in larger quantities than this has a deleterious effect upon the reaction.

This telomerization reaction can be carried out over a wide range of temperatures, from about 50° C. to over 250° C. The temperatures used may be suited to the type of products desired according to the general rule that, at increased temperatures, the products are of lower average molecular weight. The preferred temperature for any given telomerization depends also on the catalyst. The preferred reaction temperature lies in the range of 50 to 150° C. The preferred catalysts, such as the diacyl peroxides, are generally employed in this temperature range. Telomerizations with less active catalysts sometimes require temperatures of the order of 150 to 250° C. Thus, with lead tetraphenyl or molecular oxygen, a temperature in the neighborhood of 200° C. is preferred.

The pressures used should, in general, be suitable to the polymerization of ethylene, preferably higher than 100 atmospheres, although the invention is not limited to this since telomerization may take place at a pressure lower than that required for the polymerization of ethylene by itself. Pressures above 400 atmospheres are especially preferred. The upper limit of pressure is only that which the equipment will stand. The range of 400 to 1000 atmospheres provides good working pressures.

The preferred reaction medium is water, but the reaction can also be carried out in the absence of solvent, or in the presence of any solvent which does not appreciably react with the ethylene or the hydrogen chloride. Suitable solvents which may be mentioned are aliphatic and aromatic hydrocarbons, aliphatic and aromatic ethers, and alkyl chlorides; e. g., the preformed reaction products.

The ratio of hydrogen chloride to ethylene used in telomerization can be varied widely. In general, increasing the ratio of hydrogen chloride to ethylene decreases the average molecular weight of the product. The preferred molecular ratio of hydrogen chloride to ethylene will depend upon the chain length of the product desired, but will generally be in the range of 10:1 to 1:10. It must be emphasized that the average chain length of the telomer, i. e., the number of taxomon units, is a function of the concentration of taxogen which is maintained in the reaction system, and, when the taxogen is a gas, this is dependent on the reaction pressure. The telogen, hydrogen chloride, should amount to at least 5 per cent based on the weight of the ethylene and, preferably, it is present in amounts of from 10 per cent to 1000 per cent based on the weight of the ethylene.

It is sometimes desirable to add one or both of the reactants to the system as the reaction progresses. This can be done by injection of the vapor or liquid into the reaction system by well known means. It is also feasible to add a catalyst to the system as the reaction progresses. This can be accomplished, for example, by injecting a solution of the catalyst in one of the reactants or in an inert solvent. This procedure is especially advantageous in those cases where the reaction takes place very rapidly. In such instances, portionwise or slow-continuous addition of the catalyst to the system facilitates the control of the reaction and generally leads to higher yields.

It is within the scope of this invention to carry out telomerization reactions in a continuous flow system. For example, a mixture of reactants and catalyst can be passed continuously through a zone which is under telomerization conditions. Alternatively, the catalyst can be injected into the system which is passing through the reaction zone. In some cases, advantage may be derived by adding one of the reactants to the mixture in the reaction zone. This is especially true when the reaction is so rapid as to cause a marked change in concentration in one of the reactants. Continuous operation possesses many technical advantages such as economy of operation, accurate control of the reaction, and flexibility of operation. By continuous operation, a constant ratio of reactants can be maintained during the reaction if so desired.

The uses of alkyl chlorides as solvents, heat-exchange media, alkylating agents in chemical reactions, etc., are well known. The mixtures of alkyl chlorides produced by telomerization can be separated into their components for these purposes, or can be used whole or only partially fractionated. Most of the alkyl chlorides of more than 20 carbon atoms are new compositions of matter; those containing more than 30 carbon atoms, i. e., those of the formula $H(CH_2CH_2)_nCl$ where $n$ is greater than 15 are all new. They are not conveniently obtained in pure condition, but their mixtures have unique properties. They are greasy or wax-like and water-repellent, and, since their hardness, melting point, etc., can be varied at will, they can be used to replace many of the natural waxes of commerce. They undergo the same chemical reactions as do the lower alkyl halides, and can thus be converted into a variety of useful derivatives.

It is apparent that many widely different embodiments of this invention may be made without departing from the spirit and scope thereof, and, therefore, it is not intended to be limited except as indicated in the appended claims.

We claim:

1. A process for preparing liquid to solid alkyl chlorides of the formula $$H(CH_2CH_2)_nCl$$

wherein $n$ is a plural integer which comprises reacting hydrogen chloride and ethylene at a temperature of at least 50° C. and a pressure of at least 100 atmospheres in the presence of a catalyst, said catalyst being selected from the class consisting of peroxygen compounds, molecular oxygen, tetraphenyllead, tetraethyllead, amine oxides, dibenzoylhydrazine, hydrazine salts and hexachloroethane, and isolating the liquid to solid alkyl chlorides of the above formula.

2. A process for preparing liquid to solid alkyl chlorides of the formula $$H(CH_2CH_2)_nCl$$

wherein $n$ is a plural integer which comprises reacting hydrogen chloride and ethylene at a temperature in the range of 50° C. to 250° C. and a pressure of at least 400 atmospheres in the presence of a catalyst and water, said catalyst being selected from the class consisting of peroxygen compounds, molecular oxygen, tetraphenyllead, tetraethyllead, amine oxides, dibenzoylhydrazine, hydrazine salts and hexachloroethane, and isolating the liquid to solid alkyl chlorides of the above formula.

3. A process for preparing alkyl chlorides which comprises reacting hydrogen chloride and ethylene at a temperature in the range of 50° C. to 150° C. and a pressure of 400 to 1000 atmospheres in the presence of a peroxygen catalyst and water.

4. A process for preparing alkyl chlorides which comprises reacting hydrogen chloride and ethylene at a temperature in the range of 50° C. to 150° C. and a pressure of 400 to 1000 atmospheres in the presence of a diacyl peroxide catalyst and water.

5. A process for preparing alkyl chlorides which comprises reacting hydrogen chloride and ethylene at a temperature in the range of 50° C. to 150° C. and a pressure of 400 to 1000 atmospheres in the presence of benzoyl peroxide as a catalyst and water.

6. A process for preparing liquid to solid alkyl chlorides of the formula $$H(CH_2CH_2)_nCl$$

wherein $n$ is a plural integer which comprises reacting hydrogen chloride and ethylene in the molecular ratio range of from 1:10 to 10:1 at a temperature of at least 50° C. and a pressure of at least 100 atmospheres in the presence of a catalyst, said catalyst being selected from the class consisting of peroxygen compounds, molecular oxygen, tetraphenyllead, tetraethyllead, amine oxides, dibenzoylhydrazine, hydrazine salts and hexachloroethane, and isolating the liquid to solid alkyl chlorides of the above formula.

7. A process for preparing alkyl chlorides which comprises reacting hydrogen chloride and ethylene in the molecular ratio range of from 1:10 to 10:1 at a temperature in the range of 50° C. to 150° C. and a pressure of 400 to 1000 atmospheres in the presence of a peroxygen catalyst and water.

8. A process for preparing alkyl chlorides which comprises reacting hydrogen chloride and ethylene in the molecular ratio range of from 1:10 to 10:1 at a temperature in the range of 50° C. to 150° C. and a pressure of 400 to 1000 atmospheres in the presence of benzoyl peroxide as a catalyst and water.

WILLIAM E. HANFORD.
JESSE HARMON.

REFERENCES CITED

The following references are of record in the file of this patent:

UNITED STATES PATENTS

| Number | Name | Date |
|---|---|---|
| 2,058,466 | Kharasch | Oct. 27, 1936 |
| 1,591,151 | Wibaut | July 6, 1926 |
| 1,518,182 | Curme | Dec. 9, 1924 |
| 1,963,100 | Salzberg | June 19, 1934 |

(Other references on following page)

FOREIGN PATENTS

| Number | Country | Date |
|--------|---------|------|
| 553,065 | French | May 12, 1923 |

OTHER REFERENCES

Maas, "Jour. Am. Chem. Soc.," vol. 46, pages 2664–2673 (1924).

Brouwer, "Rec. Trav. Chim.," vol. 53, pages 1001–1010 (1934).

Kharasch, "Jour. Am. Chem. Soc.," vol. 55, pages 2531–3 (1933).

Kharasch, "Jour. Am. Chem. Soc.," vol. 56, pages 1212–1214, 1243–1245 (1934).

Pieverling, "Annalen," vol. 183, pp. 347–9.

Heiduschka, "Jour. Prakt. Chem.," vol. 99 (2), pp. 303–312.

Gascard, "Comptes Rendus," vol. 170, pages 886–8 (1920).

Gascard, "Annales de Chimie et Physique," vol. 15 (9), pages 332–389 (1921).

Francis, "Proc. Roy. Soc." (London), vol. A158, pp. 691–718 (1937).

Ellis, "Chem. of Petroleum Derivs.," 1934, pages 588–589, 592–595.